United States Patent [19]

Schoettle

[11] 3,739,466

[45] June 19, 1973

[54] METHOD OF MANUFACTURING AN EXTENDED-TAB MEMORY FRAME

[75] Inventor: Kenneth L. Schoettle, Hudson, Minn.

[73] Assignee: Sperry Rand Corporation, New York, N.Y.

[22] Filed: Nov. 22, 1967

[21] Appl. No.: 684,992

[52] U.S. Cl. .................. 29/604, 29/625, 174/68.5, 340/174 MA

[51] Int. Cl. .............................................. H01f 7/06

[58] Field of Search .................... 174/68.5; 29/604, 29/625, 626, 630 B; 340/174 MA, 174

[56] References Cited

UNITED STATES PATENTS

| | | | |
|---|---|---|---|
| 3,183,579 | 5/1965 | Briggs et al. | 29/604 |
| 3,210,745 | 10/1965 | Dadamo et al. | 29/604 X |
| 3,221,285 | 11/1965 | Jackson et al. | 29/604 UX |
| 3,264,402 | 8/1966 | Shaheen et al. | 29/625 X |
| 3,301,730 | 1/1967 | Spiwak et al | 174/68.5 UX |
| 3,382,572 | 5/1968 | Crawford et al. | 29/604 |
| 3,399,452 | 9/1968 | Reid | 29/630 X |
| 3,411,205 | 11/1968 | McGinley | 29/625 |

*Primary Examiner*—John F. Campbell
*Assistant Examiner*—Carl E. Hall
*Attorney*—Thomas J. Nikolai, Kenneth T. Grace and John P. Dority

[57] ABSTRACT

An improved extended-tab core memory array frame and method for manufacture are described. The structure includes embedded extended-tab and pads. The method includes preforming extended-tab arrays for bonding to a laminated epoxy glass frame.

6 Claims, 5 Drawing Figures

METHOD OF MANUFACTURING AN EXTENDED-TAB MEMORY FRAME

BACKGROUND OF THE INVENTION

1. Field of the Invention

This invention relates generally to that area of data processing concerning devices for magnetically storing information. More specifically, in data processing equipment that utilizes magnetizable toroidal cores for the storage of information, it is necessary to provide frames for holding the wires used to string the cores, and to provide a means for coupling these wires to external circuitry. This invention relates, then, to a new and improved memory frame and a new and improved method for manufacturing the memory frame.

2. Description Of The Prior Art

Information storage or memory matrices are utilized in electronic data processing systems. These matrices are comprised of a coordinate array of toroidal magnetic cores, with the cores arranged in a configuration having wires running through them in at least two directions. The wires running through the cores are characteristically secured at each end to a corresponding terminal provided on an insulating frame that surrounds the matrix array of cores. One type of memory frame that has been used is a machined epoxy glass laminated frame for use in a coincident-current memory system. Another type of frame is a molded frame having assembled-in contacts comprising printed circuit extending tabs for use in making couplings externally to the frame. This molded variety of contacts extend beyond the frame in an extended cantilever fashion, thereby giving rise to the term "extended-tabs." These extended-tabs are utilized to make contact with associated extended-tabs, for instance by bending the extended-tabs so that they are in contact. A subsequent operation with this type of frame is the gang soldering of an entire edge of the frame by dip-or flow- soldering techniques. Interconnection of circuits when stacking this type of memory frame is accomplished, for example, by bending the extended-tabs toward each other from adjacent frames and permanently connecting them by soldering, welding, or thermal compression bonding techniques. Fabrication of one type of prior art extended-tab frame is described in the copending application of Carl T. Crawford, et al., filed Dec. 28, 1965, Ser. No. 517,019, and assigned to the Sperry Rand Corporation, the assignee of this invention.

In the prior art it was customary to drill interconnection holes in the memory frame prior to bonding and etching the copper circuitry. This operation resulted in a waste of time and expense in performing both the bonding and drilling operations should an etching defect subsequently occur. Another common practice of the prior art was to bond copper foil material to both sides of the memory frame. Having thus bonded the copper laminate to the frame, both sides were exposed and etched simultaneously. This operation results in the waste of one side should an etching defect occur on the other side. Since the etching was characteristically done following the bonding to the frame, any etching defect would again scrap the frame, the bonding time and labor expense.

As the size of the magnetic cores is decreased, the size of the frame is correspondingly decreased. This reduction in size of the frame necessarily results in a decrease in size for the extended-tab members and for the wire connection paths. Considerable problems have been experienced in the prior art as the size of the pads and extended-tabs are reduced in that any physical force which may be exerted on them during soldering or in drilling would cause the pad or extended-tab to be moved, thereby destroying the bond which secured it to the frame.

SUMMARY

The improved method of this invention includes the bonding of a copper foil to a flexible semi-cured epoxy glass member, and of etching the desired extended-tab and connection pad arrays. These pre-formed assemblies are positioned on opposite sides of a preformed memory frame and bonded thereto by the application of heat and pressure. By controlling the heat and pressure applied during the bonding stage, an improved extended-tab memory frame structure results, wherein the extended-tabs and pads are embedded in the supporting bonding layer in a manner such that the exposed surfaces are flush with the outer surface of the bonding layer, thereby securing holding the pads and extended-tabs in position, and rendering them substantially unaffected by subsequent pressures that may occur during further fabrication processes.

It is to the foregoing summarized problem of the prior art that the subject invention attends itself. In order to avoid the unnecessary expense of labor and time required by the pre-drilling of the frame, which is lost when the copper foil is bonded to the frame and an etch fault results, this invention operates to form the extended-tab and pad elements on a thin layer of epoxy glass. These assemblies can then be checked prior to the bonding and only those units which are determined to be acceptable passed into the bonding step. Accordingly, it is a primary object of this invention to provide an improved manufacturing system wherein the extended tab elements are formed prior to the bonding thereof to the memory frame.

In considering the problem of the breaking of the bond of the pad or extended-tabs due to an excessive amount of pressure applied thereto, it has been discovered that the problem is essentially eliminated if the pads and extended-tabs are embedded in the bonding layer such that the exposed surfaces are flush with the outer surface of the bonding layer. This is accomplished during the manufacturing process by controlling the heat and bonding pressure such that the preformed pads and extended-tabs displace a predetermined amount of the supporting bonding layer, thereby resulting in the flush structure. Therefore, it is a further object of this invention to provide an improved memory frame structure wherein the extended-tabs and pads are embedded in the bonding layer and are flush with the surface thereof.

DESCRIPTION OF THE PREFERRED EMBODIMENT

Figure 1:
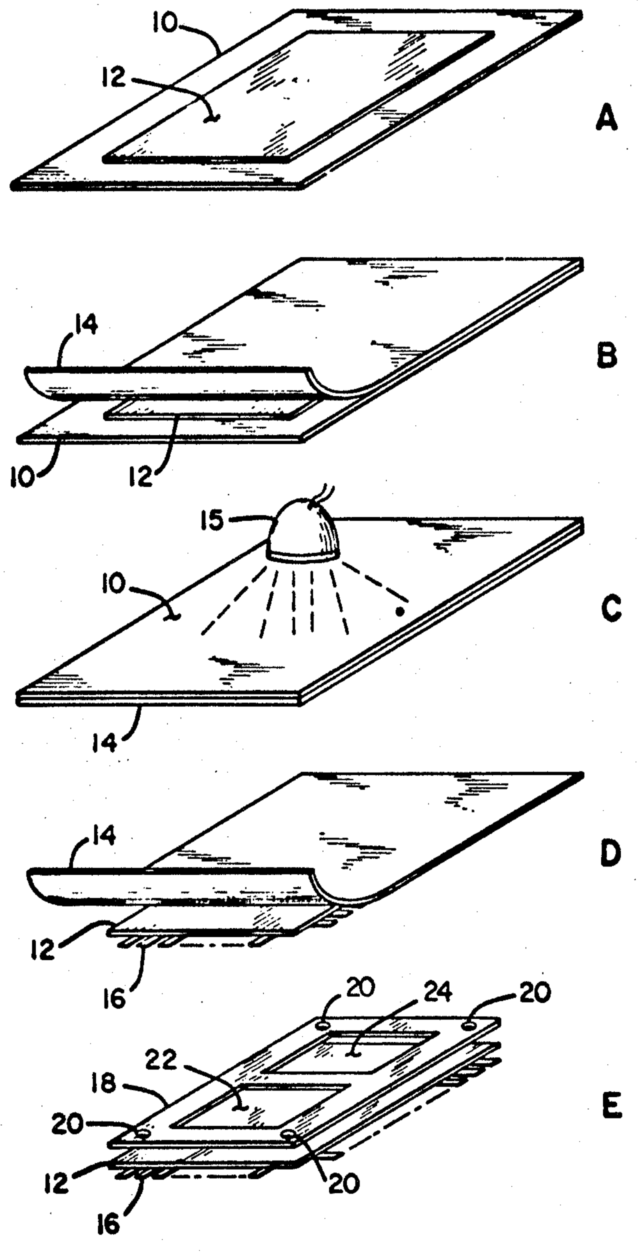
FIG. 1 is a series of views illustrating a typical memory frame during production in accordance with the process illustrated in FIG. 2.

FIG. 1 illustrates in a sequence of views designated A, B, C, D and E, the arrangement of parts in the sequence of manufacturing the improved extended-tab core frame of this invention.

A sheet of copper foil 10 of the type commonly used in printed circuit fabrication, and readily available commercially, is cut to a predetermined size larger than that of the resultant extended-tab frame. A semi-cured epoxy glass layer 12, commonly referred to as prepreg, is cut to a size approximately 20 mils smaller than the size of the extended-tab core frame assembly as it will ultimately exist after manufacturing is complete. This semi-cured epoxy glass has the characteristic of being substantially non-flowing during heat curing, and is available commercially, for instance from Fortin Laminate Company. The characteristics of the prepreg which has been found to be most advantageous for the improved extended-tab memory frame, is a material having a thickness of 3 to 4 mils with approximately 75 percent resin content. An epoxy glass of approximately these characteristics is commonly referred to as 104 glass. In order to bond the prepreg 12 to the copper foil 10, the prepreg is positioned on the copper foil and placed in a heating press. The structure is heated at approximately 240°–260° F. under 275–325 PSI for approximately 15 seconds. There is no need to allow the press to cool prior to removal of the bonded layers.

Having bonded the prepreg to the copper foil at step A, the assembly proceeds on to step B, wherein a protective coating 14 is applied over the surface of the prepreg 12 and the exposed upper surface of the copper foil 10. This protective coating can be simply a Mylar adhesive tape. Alternatively, the surface and the copper foil can be roughened before bonding. This protective coating is utilized to protect the underside of what will ultimately be the extended-tabs during the etching process.

Having applied the protective coating, the assembly proceeds to step C where the exposed side of the copper laminate 10 is cleaned and a photo-resist applied. The photo-resist material may be of the type such as referred to as Shipleys AZ 111, or equivalent, marketed by Shipleys Co., Inc., and may be applied by a dipping process, a roller, or spraying process, or any suitable process in accordance with techniques, which will apply uniform coating over the entire surface of the copper laminate 10. The photo-sensitive resist material then proceeds through a print operation which comprises exposing selected areas of the photo resist coated copper laminate to a suitable light source 15. In this instance, a positive mask (not shown) which defines the extended-tab and connective pad arrays, along with whatever printed circuitry is desired for the particular core winding technique, is utilized during this exposure process. The particular photo-sensitive resist material utilized is that which can be removed during developing after having been exposed to light. That is, in those areas which have been exposed to the light source 15 through the mask element, the resist is partially broken down. Thus, where the resist coating is exposed to light, it is rendered relatively soluable in various solvents that otherwise would not readily dissolve the coating. After exposure to the light source 15, the assembly is passed into a developing process which removes the areas which have been exposed to the light source. A process of developing consists of subjecting the surface to a suitable developer solution such as Shipleys photo-resist developer, marketed by Shipleys Co., Inc., for dissolving away the exposed photo-resist to bare selected areas of the conductive sheet. The surface then proceeds through a dying process, for example, utilizing Shipleys photo-resist dye, marketed by Shipleys Co., Inc. The photo-resist material has an affinity for the particular dye solution being used. The result of the dying operation is to provide a clear visual indication of the patterns, so that patterns can be visually checked. The surface is then cleaned as by subjecting it to a water rinsing process and dried. Finally, the assembly is etched by a process which consists of etching the non-hardened areas which have not been exposed through the aforementioned mask by dipping the assembly in an etchant solution. The etchant solution affects only those areas of the conductive sheet 10 from which the photo-resist material has been removed. The photo-resist material resists etching while the etchant solution attacks the metal portion of copper 10 at the unprotected areas. After completing the etching process, the remaining photo-resist material is removed from the terminal tab elements by re-exposing them and developing again. The extended-tabs and pads and printed circuitry are then cleaned as by water rinsing and dried. The foregoing described etching process, or others well-known to the prior art, can be utilized to establish the printed circuitry and the extended tabs on the prepreg.

Having developed the extended-tab structure, the assembly can be viewed in portion D of FIG. 1. There it can be seen that the protective coating 14 is being removed from the back side of the prepreg 12. This exposes the underside of the extended tab members, identified characteristically by numeral 16.

Figure 5:
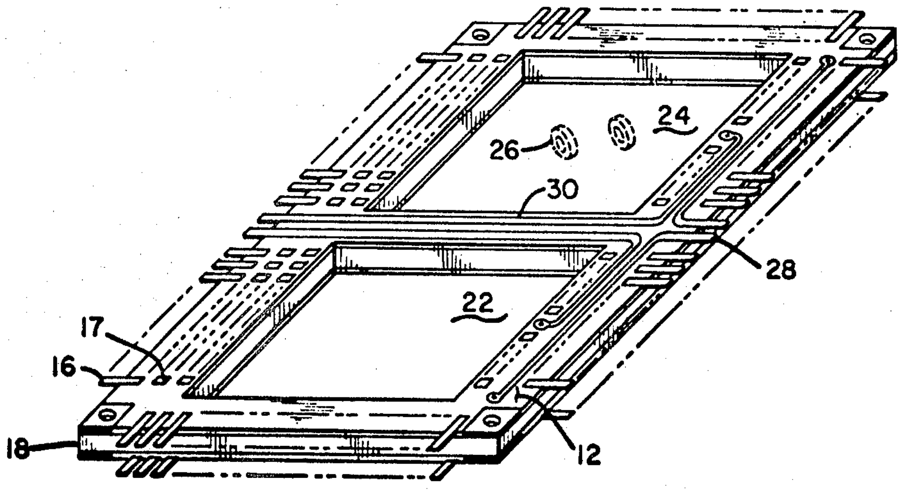
FIG. 5 is a perspective view of the improved memory frame of the subject invention.

Once the protective coating 14 is removed, either by peeling away the adhesive, or by chemically removing a protective coating, the prepreg with the extended-tabs bonded thereto is mounted to an epoxy laminate frame 18, as shown in step E. The epoxy laminate frame 18 has been sheared to size and has had locating holes 20 drilled therein. Additionally, the desired portions have been punched out leaving apertures 22 and 24 for receiving the core arrays. While two apertures 22 and 24 are shown, it should be understood that a single aperture or multiple apertures can be equally as well fabricated by this inventive process. The prepreg layer is positioned adjacent the frame member 18 on one side thereof. Characteristically, a second extended-tab assembly is positioned on the upper surface of the frame 18. Attention is directed briefly to FIG. 5 which illustrates the sandwich arrangement. The assembly of the upper extended-tab array, the frame, and the lower extended-tab array is then placed in a heat press for final bonding. An advantageous set of parameters for this bonding operation has been found to be approximately 100 ± 10 PSI curing for approximately 30 minutes at approximately 340° ± 5°F.

After removing the assembly from the heating press, it is then necessary only to remove the portions of the prepreg from the upper and lower layers that cover apertures 22 and 24. The assembly is then in a condition that the connective holes in the extended-tabs and pads can be drilled for assembly of the final core array. A final cleaning and emersion tin-coating is desirable for protection and solderability.

Figure 2:
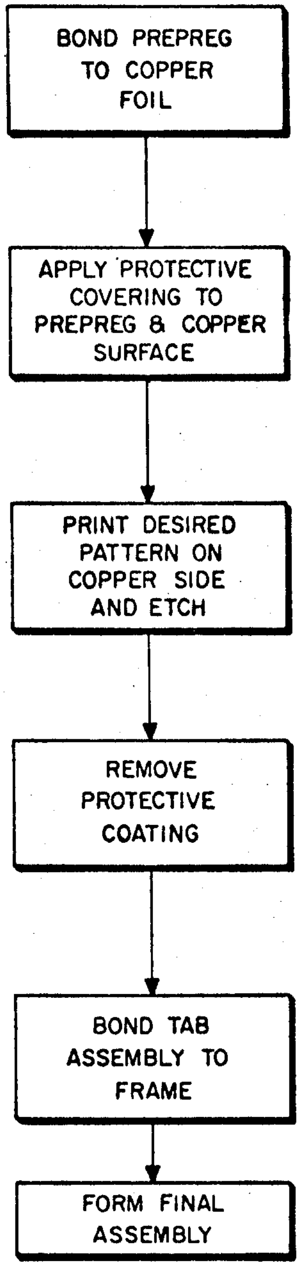
FIG. 2 illustrates the various steps in the improved manufacturing process and is coordinated with the memory frame development steps, by the manufacturing step being placed opposite the illustration of the article as it appears in the associated step.

FIG. 2 illustrates the steps in process form that have just been described with regard to the physical operations that result in the improved extended tab memory frame of this invention, and the lettered steps correspond to the associated physical arrangement shown in FIG. 1.

Figure 3:
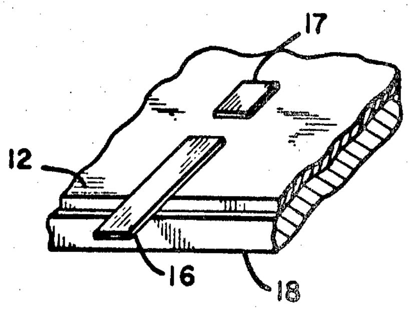
FIG. 3 illustrates one extended-tab and one connection-pad as it exists on the epoxy glass support member prior to bonding to the memory frame.
Figure 4:
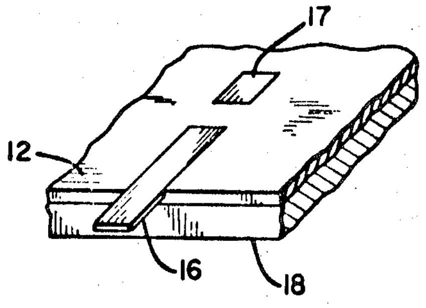
FIG. 4 illustrates the same extended-tab and connection-pad embedded in the supporting epoxy glass following the bonding of the assembly to the memory frame.

FIG. 3 illustrates the condition of the extended tab 16 and pad 17 as it is bonded on the surface of the prepreg material 12 and positioned on the frame 18, immediately prior to the final bonding operation. It will be noted that the extended-tab 16 and pad 17 ride up on the surface of the prepreg 12. It will also be noted that the prepreg is undersized from the outer edge of frame member 18 by approximately 20 mils as described above. It can be seen that the very small extended-tabs and pads are subject to being dislodged, should the surface bond be broken in any way. It is over this problem of the prior art that the subject invention provides a substantial benefit. Turning attention to FIG. 4, which illustrates the pad 17 and the extended-tab 16 embedded in the prepreg 12 after the final bonding process, it can be seen that there no longer is merely a surface bond. While it has been stated that the type of material specified as the semi-cured epoxy glass is substantially non-flowing during curing, at the pressure and temperature specified, there will be a displacement of prepreg material such that the extended-tab 16 and pad 17 are forced into the surface of the prepreg 12 such that the upper surface of the extended-tab and pad is flush with the upper surface of the prepreg. The portion of the prepreg 12 thus displaced, is forced outward on the frame 18 such that the edge of the prepreg 12 is substantially adjacent the edge of the frame 18. Of course it should be pointed out that the size of the extended-tab to be formed, the spacing of the extended-tabs, the thickness of the prepreg material, and the heat and pressure at which bonding is to take place all affect the depth to which the extended-tab 16 and pad 17 will be forced into the prepreg 12 and will affect the amount of undersizing of the prepreg layer to result in the substantially flush edges after bonding. It can readily be seen that when the extended-tabs and pads are embedded in the prepreg material, as in this inventon, that substantially greater forces can be applied thereto without breaking either the extended-tabs or the pads away from the bonded structure. This results in a much enhanced assembly wherein loss of units is minimized during the drilling operation as a result of any of the elements being dislodged, and provides a much enhanced structure over that of the prior art.

FIG. 5 is a perspective view of the improved extended-tab core memory frame of this invention. In FIG. 5 is illustrated the extended-tab array going completely around the outside periphery of the frame 18. Extended-tabs such as 16 are shown embedded in the prepreg bonding material 12 as described above. Apertures 22 and 24 are shown cut away in a condition ready to receive the core array. Cores are shown in dotted line as element 26. The cores are shown merely to illustrate that an array exists in the apertures, and is not intended to depict entirely the arrangement of the magnetic cores since they do not form a part of this invention. In the embodiment illustrated, in addition to the extended-tabs such as 16 and pads 17, printed circuit conductive paths such as 28 and 30 are also illustrated. As mentioned above, these conductive paths are utilized depending upon the form of the wiring configuration of the core array.

CONCLUSION

From the foregoing detailed description of the physical arrangement of the improved extended-tab memory frame, and the description of the improved process for manufacturing the extended-tab memory frame, it can be seen that the various objectives mentioned above have been achieved.

The physical structure is much improved over that of the prior art by virtue of the extended-tabs and the pads and the printed circuit paths being embedded in the bonding material thereby being substantially impervious to being dislodged as a result of shock or jar. Additionally, the resultant structure has a superior bond strength wherein the copper foil is bonded to the prepreg and the prepreg is in turn bonded to the memory frame. This bond strength is much improved over the prior art wherein the copper laminate was usually bonded directly to the core frame.

The manufacturing process described is much improved over that of the prior art by virtue of the reduction of scrap cost and labor cost. As mentioned above, the prior art practice was to bond the copper foil to both sides of a frame and to etch both sides simultaneously. This resulted in the scrap of both sides should an etching defect occur in either of the sides. Additionally, the labor and material expended in the bonding and etching processes would be lost. In the improved process described above, each assembly of extended-tabs and pads is manufactured separately, thereby minimizing the material loss due to an etching defect. This saves the loss of labor and material which would otherwise be lost due to etching after the bonding as in the prior art. Additionally, under the improved method, the bonding labor is not lost due to an etching defect.

Having now fully described and disclosed the preferred embodiment of this invention, and it being understood that suitable modifications may be made in the method and structure as disclosed, provided that such modifications come within the spirit and scope of the appended claims, what is desired to be protected by Letters Patent is set forth in the appended claims.

I claim:

1. The method of manufacturing an improved memory frame comprising the steps of:

a. cutting a layer of semi-cured epoxy-glass laminate to a predetermined size, said size being smaller than an associated sheet of conductive foil, said foil being of predetermined thickness;

b. bonding one side of said glass laminate to one side of said conductive sheet such that a portion of said sheet extends beyond the edges of said glass laminate and around said glass laminate;

c. applying a protective coating to another, unbonded, exposed side of the glass laminate and the portion of said one side of said conductive sheet extending beyond and around said glass laminate;
d. printing and etching a desired pattern of conductive paths on the uncoated side of said conductive sheet, said conductive paths being supported by and bonded to said glass laminate with portions of said conductive paths being extended in a cantilever fashion beyond the edge of said glass laminate;
e. removing said protective coating;
f. positioning the now exposed glass laminate surface on a pre-formed supporting memory frame to form an assembly; and
g. subjecting the assembly to heat and pressure for curing said semi-cured epoxy-glass laminate and simultaneously bonding said glass laminate surface to said frame.

2. The method of claim 1 and further including the steps of:
h. forming a second predetermine array of conductive paths supported on a second layer of semi-cured epoxy glass laminate as defined in steps a through e;
i. positioning the exposed surface of said second glass laminate on the reverse side of said supporting memory frame; and
j. performing step g.

3. The method of claim 2 wherein the bonding of said glass laminate to said sheet of conductive foil comprises the steps of:
a. positioning said foil and said layer of glass laminate in contact in a heating press; and
b. heating to a temperature in the range of approximately 240° to 260° Fahrenheit at a pressure of approximately 275 to 325 pounds per square inch for a predetermined period.

4. The method of claim 1 wherein the step of bonding said glass laminate to said frame includes the step of:
a. imbedding said conductive paths in said layer of glass laminate a distance substantially equal said thickness of said conductive paths.

5. The method of claim 1 wherein said last named step includes:
a. positioning said frame and said glass laminate supported conductive paths in a heating press;
b. heating the assembly to a temperature in the range of approximately 335° to 345° Fahrenheit at a pressure of approximately 90 to 110 pounds per square inch for a predetermined period, said heat and pressure operative to force a displacement of a portion of said glass laminate with said conductive paths thereby imbedded in said layer of glass laminate.

6. The method of claim 1 wherein the step of cutting a layer of glass laminate includes the step of:
a. trimming the size of said layer of glass laminate to a predetermined size smaller than said memory frame.

* * * * *